S. G. THOMSON.
LOCOMOTIVE DRIVING MECHANISM.
APPLICATION FILED JULY 21, 1915.
1,182,057.
Patented May 9, 1916.
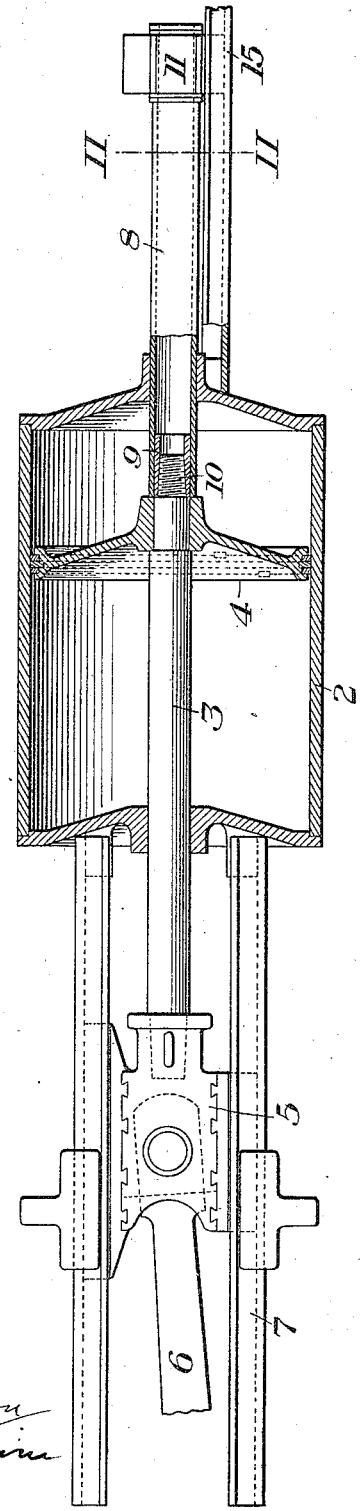
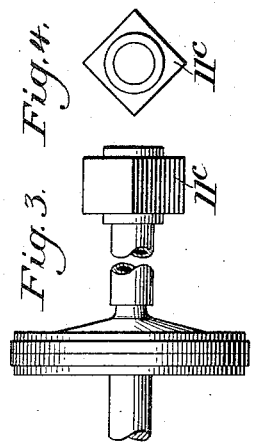
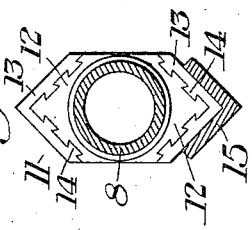
WITNESSES
INVENTOR
S. G. Thomson

UNITED STATES PATENT OFFICE.

SAMUEL G. THOMSON, OF READING, PENNSYLVANIA.

LOCOMOTIVE DRIVING MECHANISM.

1,182,057.   Specification of Letters Patent.   Patented May 9, 1916.

Original application filed May 18, 1915, Serial No. 28,829. Divided and this application filed July 21, 1915. Serial No. 41,071.

*To all whom it may concern:*

Be it known that I, SAMUEL G. THOMSON, a citizen of the United States, and resident of Reading, in the county of Berks and State of Pennsylvania, have invented a new and useful Improvement in Locomotive Driving Mechanism, of which the following is a full, clear, and exact description, reference being had to the accompanying drawings, forming part of this specification, in which—

Figure 1 is a view partly in side elevation, partly in vertical section, and largely diagrammatic, illustrating one form of my invention. Fig. 2 is a section on the line II—II of Fig. 1. Fig. 3 is a side view, partly broken away, showing the piston and piston rod extension and head; and Fig. 4 is an end view of the head.

The present application is a division of my pending application Serial No. 28,829, filed May 18, 1915.

The present invention has relation to an improvement in driving mechanism for locomotives, and more particularly to the novel construction of the piston rod extension and the means for guiding the same.

The object of my invention is to provide a construction of these parts in which it is possible to make them much lighter than heretofore, while at the same time they have the proper strength.

Referring to the accompanying drawings, in which I have shown a preferred embodiment of my invention, the numeral 2 designates one of the locomotive cylinders, 3 the piston rod, 4 the piston, 5 the crosshead, 6 the main rod connected to the crosshead, and 7 the crosshead guides.

8 designates the piston rod extension at the front end of the cylinder 2. In accordance with my invention, I prefer to make this extension in the form of a light tubing of substantially the same diameter as the diameter of the piston rod, and having a bushing 9 forced into its rear end. This bushing is internally threaded and is screwed to the threaded end portion 10 of the piston rod. When tightened in this position, the tubing may be welded and thus make a very strong connection. The connection may, however, be made in any other suitable way; for instance, the piston rod extension may be connected directly to the piston head, instead of to the piston rod.

The essential feature of the invention consists in the use of a light piece of tubing for the rod extension, rather than making it of the same forging as the piston rod, and relying on holes drilled through its center to afford lightness. Tubing of large diameter may be used without involving much metal, and great stiffness may thus be obtained with a comparatively small weight.

The piston rod extension 8 is provided with a guiding crosshead 11. This head is shown as consisting of an aluminum center 12 for which the extension 8 forms a core, and which is provided with facings 13 of suitable bearing metal such as lead or babbitt. The aluminum center may be provided with recesses into which the bearing metal is cast, as indicated at 14.

The head 11 is provided with a suitable guide 15 which is in the form of an open trough, preferably of angle or V-form, as shown in Fig. 2, in which case the bearing portions of the crosshead are of corresponding form. This permits the use of a relatively thin plate guide, which not only gives great resistance to both vertical and lateral thrusts, but is comparatively light and stiff. Preferably, the crosshead is attached to the piston rod extension in a manner to permit rotation of the head so that when one of its bearing surfaces becomes worn, it may be reversed edge for edge.

Figs. 3 and 4 show another angular form of crosshead 11ᶜ, which gives substantially the same result as that shown in Fig. 2, except that it can be brought into four different bearing positions. The crosshead shown in Figs. 3 and 4 can also be rotated into a number of different bearing positions. It is of decided advantage to have this head of angular form, instead of circular, since this form prevents the cross-head from creeping around on the extension rod; also in that, in turning the head, it must be turned to a position to bring an entirely new bearing face into play. That is to say, by reason of its angular form, the head must stay in its original position until it is purposely shifted to an entirely new position.

While I have spoken herein of the use of aluminum in the crosshead, I intend to include by this, as well as in the claims, the use of any of the various suitable alloys of aluminum, such as those in which small portions of tin, copper and nickel are added, but in which aluminum forms the main element.

My invention provides a piston rod extension and guiding means therefor, which can be made very much lighter than those heretofore in use; which has the necessary strength and stiffness combined with the reduced weight; and which also provides for bringing a fresh bearing surface of the crosshead into use without necessitating the removal and refacing of the entire head.

I claim:

1. A locomotive driving gear, comprising a cylinder, a piston therein, a piston rod for transmitting the power from the piston to the main cross head, and a projection rigidly attached to and projecting beyond the forward side of the piston, and a hollow tail rod having a rigidly secured telescopic connection with said projection, said rod carrying a guiding cross head.

2. A locomotive driving gear, comprising a cylinder, a piston therein, a piston rod for transmitting the power from the piston to the main cross head, said rod having a reduced portion extending into the hub of the piston and upon which the piston is secured, the end of the rod extending through the piston and terminating in a projecting portion, and a hollow tail rod extension fitting over said projection and secured thereto with its end abutting against the hub portion of the piston.

3. A driving mechanism for locomotives, having a driving member comprising a piston and a piston rod, and a hollow tail rod extension telescoped over and secured to a projection from said driving member.

4. In a locomotive driving mechanism, a driving member comprising a piston and piston rod, and a member projecting beyond the forward side of the piston, and a hollow tail rod extension having a rigid telescopic connection with said projecting member, said extension having a reinforced portion at the point where it joins said driving member.

5. A driving mechanism for a locomotive, having a piston, piston rod extension, and a crosshead and a single concave guide for said extension, said guide being adapted to carry all the weight and side thrust of the cross-head, said crosshead having similar substantially flat upper and lower faces and reversibly mounted on said piston rod extension.

6. A driving mechanism for locomotives, having a piston, a piston rod extension, and a cross-head and guide for said extension, said cross-head having a plurality of angular bearing faces, and the cross-head being shiftable on said extension to bring different bearing faces thereof into guiding position.

7. A driving mechanism for a locomotive, having a piston, piston rod extension, and a crosshead and guide for said extension, said crosshead adapted to turn on said piston rod extension to afford means for adjusting its alinement, said crosshead engaging substantially flat angled faces of said guide lying entirely below a horizontal plane through the widest portion of the cross-head.

8. A driving mechanism for a locomotive, having its piston provided with a forward extension and a crosshead rotatably mounted on said extension and provided with a plurality of substantially flat bearing surfaces, different surfaces being arranged to be brought into guiding position by turning the cross-head on the rod.

9. A driving mechanism for a locomotive, having a piston rod extension provided with a crosshead, said crosshead having a plurality of different substantially flat bearing surfaces, and means whereby any one of said surfaces may be brought into use.

In testimony whereof, I have hereunto set my hand.

SAMUEL G. THOMSON.

Witnesses:
HARRY EGOLF,
J. I. BEST.

Copies of this patent may be obtained for five cents each, by addressing the "Commissioner of Patents, Washington, D. C."